(12) United States Patent
Sato et al.

(10) Patent No.: US 10,839,235 B2
(45) Date of Patent: Nov. 17, 2020

(54) METHOD AND APPARATUS FOR DETECTING LIGHT SOURCE OF VEHICLE

(71) Applicant: DENSO CORPORATION, Kariya, Aichi-pref. (JP)

(72) Inventors: Hironori Sato, Okazaki (JP); Taiji Morishita, Kariya (JP)

(73) Assignee: DENSO CORPORATION, Kariya (JP)

( * ) Notice: Subject to any disclaimer, the term of this patent is extended or adjusted under 35 U.S.C. 154(b) by 168 days.

(21) Appl. No.: 15/960,856

(22) Filed: Apr. 24, 2018

(65) Prior Publication Data

US 2018/0239974 A1 Aug. 23, 2018

Related U.S. Application Data

(63) Continuation of application No. 14/399,399, filed as application No. PCT/JP2013/062950 on May 8, 2013, now Pat. No. 9,977,974.

(30) Foreign Application Priority Data

May 9, 2012 (JP) ................................. 2012-107648

(51) Int. Cl.
G06K 9/00 (2006.01)
B60Q 1/14 (2006.01)
G01J 3/46 (2006.01)

(52) U.S. Cl.
CPC ....... G06K 9/00825 (2013.01); B60Q 1/1423 (2013.01); G01J 3/46 (2013.01);
(Continued)

(58) Field of Classification Search
CPC ........... G06K 9/00825; G06K 9/00798; G06K 9/00805; G06K 9/00791; G06K 9/2027;
(Continued)

(56) References Cited

U.S. PATENT DOCUMENTS 7,565,006 B2 * 7/2009 Stam ..................... B60Q 1/085
315/82
7,949,190 B2 5/2011 Wu et al.
(Continued)

FOREIGN PATENT DOCUMENTS

JP H06276524 A 9/1994
JP 2006185410 A 7/2006
(Continued)

OTHER PUBLICATIONS

Mori et al., On-Line Vehicle and Pedestrian Detections Based on Sign Pattern, Aug. 1994 [retrieved Dec. 23, 2019], IEEE Transactions on Industrial Electronics, vol. 41, No. 4,pp. 384-391. Retrieved: https://ieeexplore.ieee.org/abstract/document/303788 (Year: 1994).*
(Continued)

*Primary Examiner* — Andrew M Moyer
*Assistant Examiner* — Dennis Rosario
(74) *Attorney, Agent, or Firm* — Harness, Dickey & Pierce, P.L.C.

(57) ABSTRACT

In a light control system, a captured image of a cruising direction of a vehicle is acquired, and a light source is extracted from the captured image. A probability for estimating a light source to be a vehicle light source originating from a vehicle is calculated based on light source parameters for differentiating the light source. A dark section that is darker than the periphery and is present below the light source in the captured image is extracted. The probability is set to be higher for the light source of which the dark section is extracted. The light source having a probability that is a reference value set in advance or higher is estimated to be a light source of another vehicle. When the dark section that is detected as a shadow of a vehicle is detected, the probability of the light source being a vehicle light source is set to be high.

9 Claims, 3 Drawing Sheets

(52) U.S. Cl.
CPC ............... *B60Q 2300/41* (2013.01); *G06T 2207/10024* (2013.01); *G06T 2207/20076* (2013.01); *G06T 2207/30252* (2013.01)

(58) Field of Classification Search
CPC ............. G06K 9/3241; G06K 2209/23; G06K 9/00818; B60Q 2300/41; B60Q 2300/42; B60Q 1/143; B60Q 1/1423; B60Q 2300/45; B60W 30/12; B60W 2420/42; B60W 30/09; B60W 2550/10; B60W 2550/306; G06T 2207/30256; G06T 2207/30261; G06T 2207/30252; G06T 2207/30248; G05D 1/0088; G05D 1/0246; G05D 1/0276; G05D 2201/0213; G08G 1/167; G08G 1/166
See application file for complete search history.

(56) References Cited

U.S. PATENT DOCUMENTS

| | | | | |
|---|---|---|---|---|
| 8,055,017 | B2* | 11/2011 | Saito | G06K 9/00825 |
| | | | | 382/103 |
| 8,224,533 | B2 | 7/2012 | Furusawa | |
| 8,456,327 | B2* | 6/2013 | Bechtel | B60R 1/04 |
| | | | | 340/435 |
| 8,786,697 | B2 | 7/2014 | Kawasaki | |
| 8,838,372 | B2* | 9/2014 | Noda | G08G 1/166 |
| | | | | 340/903 |
| 9,015,100 | B2* | 4/2015 | Kurumisawa | G06N 5/02 |
| | | | | 706/46 |
| 9,977,974 | B2* | 5/2018 | Sato | G06K 9/00825 |
| 2008/0030374 | A1 | 2/2008 | Kumon et al. | |
| 2015/0098612 | A1* | 4/2015 | Sato | G06K 9/00825 |
| | | | | 382/103 |

FOREIGN PATENT DOCUMENTS

| | | |
|---|---|---|
| JP | 2007272785 A | 10/2007 |
| JP | 2008287367 A | 11/2008 |
| JP | 2009032030 A | 2/2009 |
| JP | 2011098579 A | 5/2011 |
| JP | 2011103070 A | 5/2011 |

OTHER PUBLICATIONS

Niknejad et al., Vehicle detection and tracking at nighttime for urban autonomous driving, Sep. 25-30, 2011 [retrieved Jun. 29, 2020], 2011 IEEE/RSJ International Conference on Intelligent Robots and Systems, pp. 4442-4447. Retrieved: https://ieeexplore.ieee.org/abstract/document/6094830 (Year: 2011).*

Fossati et al., Real-time vehicle tracking for driving assistance, Jan. 23, 2010 [retrieved Jun. 29, 2020], Machine Vision and Applications, vol. 22, pp. 439-448. Retrieved: https://link.springer.com/article/10.1007/s00138-009-0243-6#citeas (Year: 2011).*

U.S. Appl. No. 14/399,399, filed Nov. 6, 2014, Hironori Sato.

International Search Report (in Japanese with English Translation) for PCT/JP2013/062950, dated Jul. 23, 2013; ISA/JP.

International Preliminary Report on Patentability (in Japanese with English Translation) for PCT/JP2013/062950, dated Nov. 11, 2014; ISA/JP.

Chan et al., Vehicle detection and tracking under various lighting conditions using a particle filter, Mar. 1, 2012, IET Intelligent Transport Systems, vol. 6, Issue 1, pp. 1-8.

Firi et al., Vehicle Detection, Classification and Position Estimation based on Monocular Video Data during Nighttime, Sep. 28-30, 2009, Proceedings of the 8th International Symposium on Automotive Lighting (ISAL 2009), 12 total pages.

Chan et al., Vehicle Detection under Various Lighting Conditions by Incorporating Particle Filter, Sep. 30,-Oct. 3, 2007, 2007 IEEE Intelligent Transportation Systems Conference, pp. 534-539.

Yoneyama et al., Robust Vehicle Detection for Highway Surveillance via Rear-view Monitoring, Nov. 20, 2003, Proc. SPIE 5203: Applications of Digital Image Processing XXVI, vol. 5203, pp. 21-32.

* cited by examiner

FIG.3
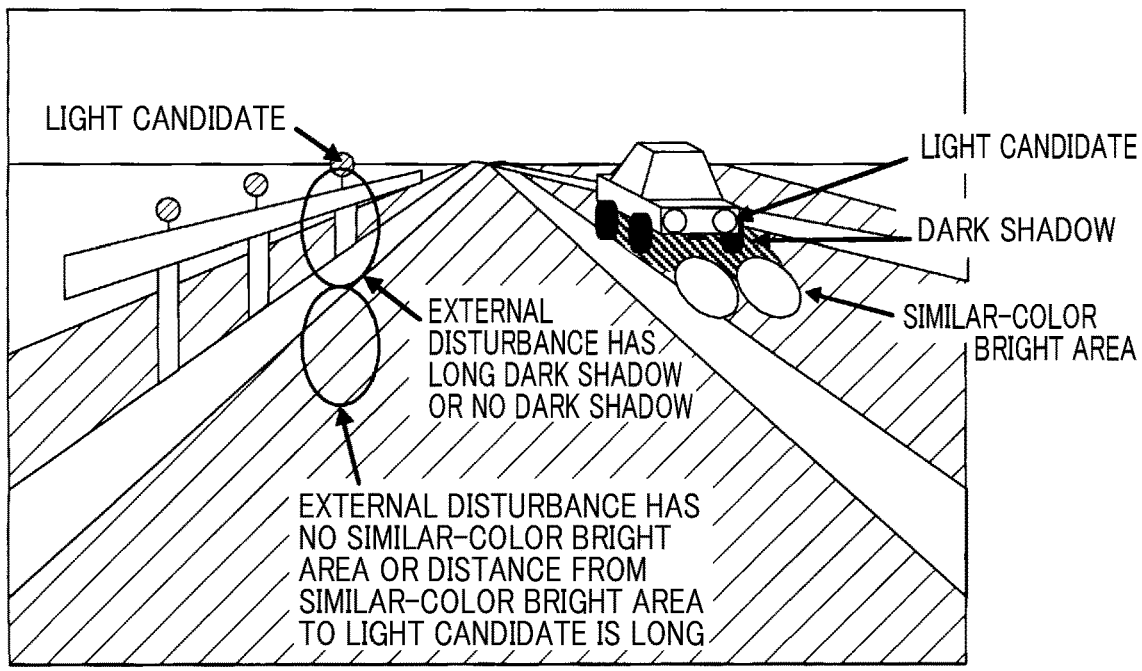
(a) [ONCOMING VEHICLE]
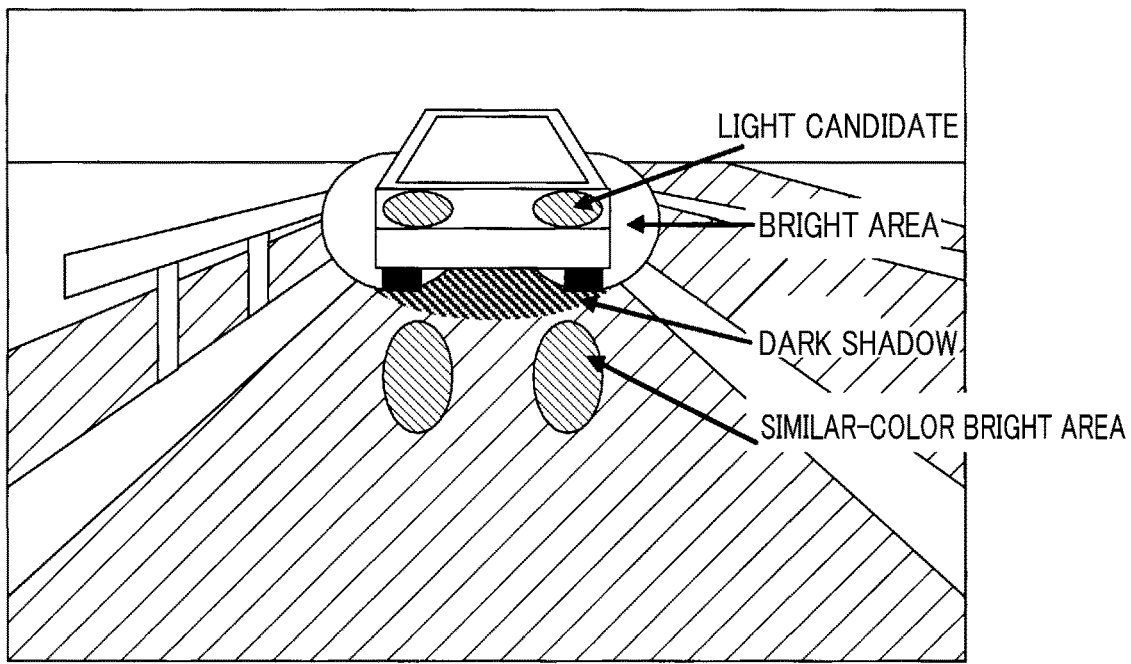
(b) [PRECEDING VEHICLE]

METHOD AND APPARATUS FOR DETECTING LIGHT SOURCE OF VEHICLE

CROSS REFERENCE TO RELATED APPLICATIONS

This application is a continuation of U.S. patent application Ser. No. 14/399,399 filed on Nov. 6, 2014 which is a U.S. National Phase Application under 35 U.S.C. 371 of International Application No. PCT/JP2013/062950 filed on May 8, 2013 and published in Japanese as WO 2013/168744 A1 on Nov. 14, 2013. These applications are based on and claim the benefit of priority from Japanese Patent Application No. 2012-107648 filed May 9, 2012. The entire disclosures of all of the above applications are incorporated herein by reference.

BACKGROUND

Technical Field

The present invention relates to a method and an apparatus mounted in a vehicle for detecting a light source of another vehicle from an image capturing a field of view outside of the vehicle.

Background Art

Conventionally, as a vehicle light source detection apparatus, an apparatus is known that, when a pair of light sources and reflected light caused by a road surface are detected from a captured image, the light sources are identified as light sources of a vehicle (refer, for example, to PTL 1).

PTL 1 JP-A-H06-276524

However, in the above-described technology, a motorcycle of which the light source does not form a pair may not be detected as a light source of a vehicle. In addition, a light source other than those of a vehicle that are disposed in a pair may be erroneously detected as a light source of a vehicle. Reliability of detection is low.

SUMMARY

Therefore, it is desired that the light source of another vehicle is able to be accurately detected.

In an example of the present disclosure, an apparatus that is mounted in a vehicle and detects a light source of another vehicle is provided. The apparatus includes: an image acquiring means for acquiring a captured image of a field of view in a cruising direction of the vehicle in which the apparatus is mounted; a light source extracting means for extracting a light source from the captured image; a probability calculating means for calculating a probability for estimating that the light source is a vehicle light source originating from a vehicle based on light source parameters for differentiating the light source; a dark section extracting means for extracting a dark section that is darker than the periphery and is present below the light source in the captured image; a probability correcting means for setting the probability to be higher for the light source of which the dark section is detected; and an estimating means for estimating a light source having a probability that is a reference value set in advance or higher to be the light source of another vehicle, among the light sources extracted by the light source extracting means.

A method for detecting a light source of a vehicle that has processing steps equivalent to the apparatus can also be provided.

In the detection apparatus and method, when the dark section that is detected as a shadow of a vehicle below the light source of the vehicle is detected, the probability of the light source being a vehicle light source is set to be high (in other words, corrected to a high value). Therefore, a light source in which a shadow is not present below the light source, such as a streetlight, can be differentiated as a light source that is not a light source of a vehicle. Therefore, the light source of another vehicle can be accurately detected. The reliability of detection is improved.

The light source parameters indicate information for differentiating the light source. Specifically, the information includes at least one type of information among color, shape, brightness, position, size, and the like of the light source.

In addition, preferably, a similar-color light source extracting means is provided. This means extracts a similar-color light source that indicates a separate light source that is present below the light source and has a color that is similar to the color of the light source and is set in advance as a color of a light source of a vehicle. In this instance, the probability correcting means may set the probability of the light source being the vehicle light source to be higher for a light source of which the similar-color light source is extracted.

In the vehicle light source detection apparatus such as this, when reflected light is detected that has a color that is set as a light source of a vehicle when the light source is reflected on a road surface below the light source and is a color similar to the color of the light source, the probability of the light source being a vehicle light source is set to be high. Therefore, the vehicle light source can be more accurately detected. The probability correcting means may set the probability of the light source being a vehicle light source to be higher for a light source of which the dark section and the similar-color light source are detected.

In addition, as another preferred example, a tail light source extracting means is provided. This means extracts a tail light source that indicates a light source having a color that is similar to the color of a taillight, from the light sources. A bright section extracting means extracting a bright section that indicates an area on the left and right sides of the light source that is brighter than the periphery. In this instance, the probability correcting means may set the probability of the light source being the vehicle light source to be higher for a light source of which a light source corresponding to the bright section is the tail light source.

In this case, when the tail light source is detected and the bright section attributed to the headlights irradiated from a preceding vehicle towards the cruising direction of the vehicle is detected, the probability of the light source being a vehicle light source can be set to be high for the light source that is the tail light source. Therefore, the vehicle light source can be more accurately detected.

When the color is detected, the color near the center may be detected. Alternatively, the average color of an area having a certain luminance or higher may be detected.

In addition, to achieve the above-described object, the present invention may be a vehicle light source detection program for enabling a computer to function as each means configuring the above-described detection apparatus.

BRIEF DESCRIPTION OF THE DRAWINGS

In the accompanying drawings:

FIG. 3 shows an example of a captured image in which, FIG. 3(a) shows a captured screen in which an oncoming vehicle is captured and FIG. 3(b) is a captured screen in which a preceding vehicle is captured.

DESCRIPTION OF EMBODIMENTS

An embodiment of a vehicle light source detection apparatus of the present invention will be described with reference to the accompanying drawings.

Figure 1:
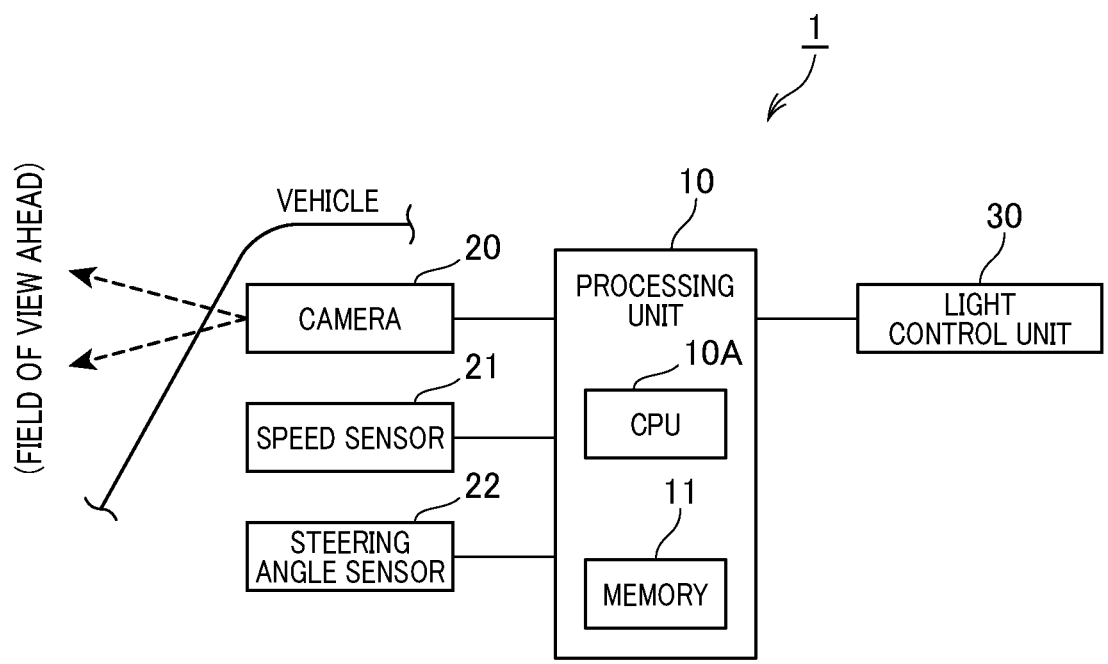
FIG. 1 is a block diagram of an overall configuration of a light control system according to an embodiment.

FIG. 1 shows a light control system 1 that provides the functions of the vehicle light source detection apparatus of the present invention. The system 1 is mounted, for example, in a vehicle such as a passenger car. The system 1 provides a function in which, when another vehicle is present near the vehicle, the direction of the optical axis of the headlights of the vehicle is changed to face downward, thereby preventing glare on the driver of the other vehicle. The change in direction of the optical axis is performed when another vehicle is present within an area in which there is likelihood of the occurrence of glare.

Specifically, the light control system 1 includes a processing unit 10, a camera 20, a speed sensor 21, a steering angle sensor 22, and a light control unit 30. The camera 20 is disposed so that at least an area within an irradiation area of the headlights in the cruising direction (particularly in the direction ahead) of the vehicle is included in the imaging range. The camera 20 is configured as a color camera that captures the area within the imaging range in color. The camera 20 sends the captured image to the processing unit 10.

The speed sensor 21 and the steering angle sensor 22 have known configurations. The speed sensor 21 and the steering angle sensor 22 are used to estimate (or classify) the cruising direction of the vehicle. The speed sensor 21 and the steering angle sensor 22 send respective detection results to the processing unit 10.

The light control unit 30 receives the detection result of the light of a vehicle from the processing unit 10 and controls the direction of the optical axis of the headlights. Specifically, when a detection result is received that indicates that the light of a vehicle is present in a captured image, the light control unit 30 switches the headlights to low beam. When a detection result is received that indicates that the light of a vehicle is not present in the captured image, the light control unit 30 switches the headlights to high beam. The light control unit 30 may be configured to move the direction of the optical axis to a direction in which another vehicle is not present (such as downward or leftward), based on a command from the processing unit 10.

The processing unit 10 is configured as a known microcomputer that includes a central processing unit (CPU) 10A and a memory 11 (which serves as a non-transitory computer readable medium), such as a read-only memory (ROM) or a random access memory (RAM). The processing unit 10 performs various processes, such as a light control process described hereafter, based on programs (including a vehicle light source detection program) stored in the memory 11. In addition, the memory 11 stores therein parameters indicating characteristics of the light of a vehicle (including values corresponding to parameters such as size, color, position such as height, distance between paired light, and behavior) and parameters indicating characteristics of light sources other than a vehicle. The parameters stored in the memory 11 are used to differentiate a light source indicating the light of a vehicle from light sources other than the light of a vehicle, and detect the light source indicating the light of a vehicle from a captured image.

Figure 2:
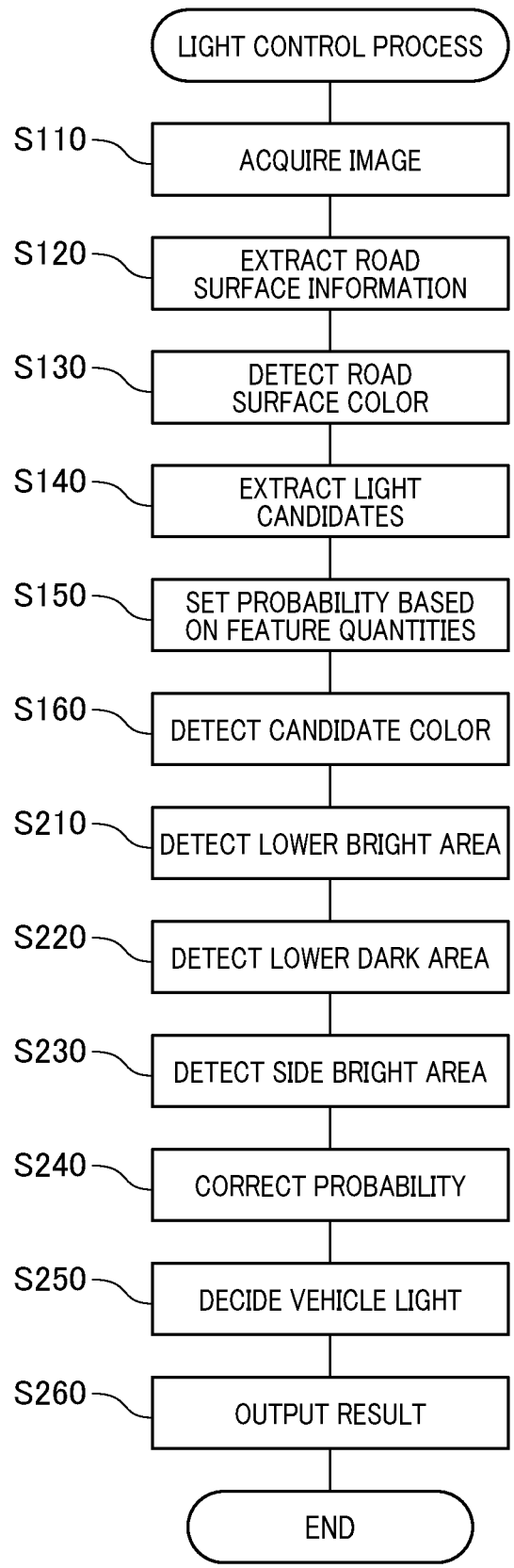
FIG. 2 is a flowchart of a light control process according to the embodiment that is performed by a processing unit of the light control system.

Next, the light control process shown in FIG. 2 will be described. In the light control process, a light source that indicates the light of a vehicle is differentiated and detected from a captured image. The direction of the optical axis of the headlights is then controlled.

The light control process is started when the power of the vehicle is turned ON. The light control process is subsequently performed at a predetermined cycle (such as every 100 ms). Specifically, as shown in FIG. 2, first, the processing unit 10 acquires an image captured by the camera 20 (S110).

Next, the processing unit 10 extracts road surface (Step S120). In this process, an area of the road surface in the captured image is identified using a known white line detection technology or the like. For example, the white lines present on the left and right sides of a cruising area of the own vehicle is detected. The area within the white lines is set as the area of the road surface.

Then, the processing unit 10 detects the color of the road surface by calculating the average color within the identified area of the road surface (Step S130). The color at a specific position (arbitrary section) on the road surface may be set as the color of the road surface.

Next, the processing unit 10 extracts a light candidate from the captured image (Step S140). In this process, the smallest area including the entire area of a single light source within the captured image is cut out in a rectangle (rectangular shape). Each cut-out area is labeled (numbered). In this process, as the light source in the captured image becomes larger, the area that is cut out becomes larger.

Next, the processing unit 10 calculates light candidate feature quantities and sets a probability as a vehicle light source based on the feature quantities (Step S150). First, in the process for determining the light candidate feature quantities, a still-image level feature quantity, a pair feature quantity, and a time-series feature quantity are determined.

Here, the still-image level feature quantity indicates a feature quantity based on the color and shape of a light source unit of the light source. The pair feature quantity indicates a feature quantity based on the relationship with another light source positioned in the horizontal direction. The time-series feature quantity indicates a feature quantity based on the results of tracking of the light source. These feature quantities are set based on the probability of the parameters, such as the color and shape of the light source, matching reference values (comparison values) stored in the memory 11.

When the light candidate feature quantities are calculated in this way, the probability of the light source being a vehicle light source is determined based on each feature quantity. Here, the probability of the light source being a vehicle light source is calculated by weighted average of each feature quantity or the like. Each feature quantity and the probability of the light source being a vehicle light source may be experimentally associated in advance.

Next, the processing unit 10 detects a light source, among the light sources, that has a candidate color (Step S160). In this process, an area extracted as a light source that has an average color that is a lamp color used as a light of a vehicle, such as the headlights, taillights, fog lamps, license plate lights, is selected.

Next, the processing unit 10 detects characteristic tendencies of when the light source is a vehicle light source (Steps S210 to S230). Here, when the light source is a vehicle light source and the subject vehicle is an oncoming vehicle that is traveling from the direction ahead of the own vehicle towards the own vehicle, as shown in FIG. 3(*a*), a dark area that is the shadow of the vehicle itself tends to be present directly below the light source (light candidate). Reflected light of the light source caused by the road surface tends to be present further below the dark area.

At this time, the reflected light of the light source caused by the road surface is a color similar to that of the light source. In addition, when the light source is not a vehicle light source, a dark area tends to not be present directly below the light source. Alternatively, the dark area tends to be present in an area away from the light source. The reflected light of the light source also tends to not be present. Alternatively, the reflected light of the light source tends to be present in an area further away from the light source.

In addition, when the subject vehicle is a preceding vehicle that is traveling in the same direction as the own vehicle ahead of the own vehicle, as shown in FIG. 3(*b*), in a manner similar to that of the oncoming vehicle, a dark area that is the shadow of the vehicle itself tends to be present directly below the light source. Reflected light of the light source caused by the road surface tends to be present further below the dark area.

Furthermore, in the case of the preceding vehicle, a bright area caused by the headlights of the preceding vehicle tends to be present to the side of the light source. Therefore, in the process at Steps S210 to S230, such tendencies are captured and used for detection of the vehicle light source.

Specifically, first, the processing unit 10 detects an area that is brighter than the luminance of the road surface (which can be calculated from the color of the road surface) within a fixed distance below the selected light source (Step S210). The fixed distance herein indicates, for example, an area that is within several meters from the light source. The distance is converted to a number of pixels based on the position of the light source. The bright area is detected from within this number of pixels.

Next, the processing unit 10 detects an area having luminance that is darker than the luminance of the road surface within a fixed distance below the light source (Step S220). The fixed distance herein is set, for example, within a range of about 50 cm from the light source, taking into consideration the height at which the headlights and the taillights are generally disposed and the distance to the area in which the shadow of the vehicle is present.

Next, the processing unit 10 detects an area having luminance that is brighter than the luminance of the road surface in an area positioned to the side of the light source (Step S230). However, the process at Step S230 is performed only when the color of the light source is a color indicating a taillight. The bright area is detected within an area over which the headlights are diffused (within a range of several meters) is detected. If the bright area is too far from the light source, an external disturbance, such as a guardrail, may be detected as the bright area. To reduce the effects of external disturbances, only the area over which the headlights are diffused is considered to be the area within which the bright area is detected.

Next, in the process at Steps S210 to S230, the processing unit 10 sets the probability of the light source being a vehicle light source to be higher for a light source of which any of the dark area that is the shadow of the vehicle itself directly below the light source, the area of the reflected light of the light source below the light source, and the bright area to the side of a light source having a color that indicates a taillight is detected (Step S240). At this time, a light source of which a plurality of areas, among the above-described areas, is detected may be set to have a higher probability. In the process at Step S240, the probability of the light source being a vehicle light source may be set to be low for a light source of which any of the dark area that is the shadow of the vehicle itself directly below the light source, the area of the reflected light of the light source below the light source, and the bright area to the side of a light source having a color that indicates a taillight is not detected in the process at Steps S210 to S230 (including when the dark area is not present directly below the light source or a dark area is present in an area away from the light source, or when the reflected light of the light source is also not present or is in an area further away from the light source).

The processing unit 10 then compares a threshold that is set in advance and a final probability. The processing unit 10 eliminates a light source having a probability that is less than the threshold as an external disturbance. The processing unit 10 thereby decides the remaining light source to be a vehicle light (Step S250). Next, the processing unit 10 sends the detection result of the vehicle light to the light control unit 30 (Step S260). The light control process is completed.

In the light control system 1 that has been described in detail as above, the processing unit 10 acquires a captured image that captures the cruising direction of the own vehicle. The processing unit 10 then extracts a light source from the captured image. The processing unit 10 calculates the probability of the light source being a vehicle light source indicating a light source originating from a vehicle, based on the light source parameters which indicate parameters related to the light source. The processing unit 10 then extracts a dark section that indicates a section that is darker than the periphery that is present below the light source. Furthermore, the processing unit 10 sets the probability of the light source being a vehicle light source to be higher for a light source of which the dark section is extracted. A light source that has a probability that is a reference value set in advance or higher is estimated (or classified) to be a vehicle light source.

In the light control system 1 such as this, the probability of the light source being a vehicle light source is set to be high when the dark section detected as a shadow of the vehicle below the light source of the vehicle is detected. Therefore, the light source of another vehicle can be accurately detected. As a result, the reliability of detection of another vehicle is improved.

The light source parameters according to the present embodiment indicate information used to differentiate lights sources. The light source parameters include at least one type of information among color, shape, brightness, position, size, and the like of the light source.

In addition, the processing unit 10 in the light control system 1 extracts a similar-color light source that indicates another light source that is present below the light source, and has a color that is similar to the color of the light source and is set in advance as a color of a vehicle light source. Furthermore, the processing unit 10 sets the probability that the light source is a vehicle light source to be higher for a light source of which a dark section and a similar-color light source are detected.

In the light control system 1 such as this, the probability of the light source being a vehicle light source is set to be high when a reflected light is detected that has a color that is similar to the light source and is set as a vehicle light source when the light source is reflected on the road surface below the light source. Therefore, the vehicle light source can be more accurately detected.

Furthermore, the processing unit 10 in the light control system 1 sets the probability of the light source being a vehicle light source based on the distance from the light source to the similar-color light source.

In the light control system 1 such as this, the height from the road surface to the light source is detected as the distance from the light source to the similar-color light source. The probability of the light source being a vehicle light source can be set based on the degree by which the distance matches a distance set as a vehicle light source. Therefore, the vehicle light source can be more accurately detected.

In addition, the processing unit 10 in the light control system 1 extracts a tail light source that indicates a light source having a color that is similar to a taillight from the light sources. The processing unit 10 extracts a bright section that indicates an area that is brighter than the periphery that is present in the areas on the left and right sides of the light source. Furthermore, the processing unit 10 sets the probability of the light source being a vehicle light source to be higher for a light source of which the light source corresponding to the bright section is the tail light source.

In the light control system 1 such as this, when the tail light source is detected and the bright section attributed to the headlights irradiating from the preceding vehicle towards the cruising direction of the own vehicle is detected, the probability of the light source being a vehicle light source can be set to be high for a light source that is a tail light source. Therefore, the vehicle light source can be more accurately detected.

When the color is detected, the color near the center may be detected. Alternatively, the average color of an area having a certain luminance or higher may be detected. In addition, the embodiments of the present invention are not limited to the above-described embodiment. Various embodiments are possible as long as the embodiments belong within the technical scope of the present invention.

The processing unit 10 according to the present embodiment corresponds to the vehicle light source detection apparatus. The process at S110 according to the present embodiment corresponds to an image acquiring means. The process at S140 according to the present embodiment corresponds to a light source extracting means. The process at S150 according to the present embodiment corresponds to a probability calculating means.

Furthermore, the process at S160 according to the present embodiment corresponds to a tail light source extracting means. The process at S210 according to the present embodiment corresponds to a similar-color light source extracting means. In addition, the process at S220 according to the present embodiment corresponds to a dark section extracting means. The process at S230 according to the present embodiment corresponds to a bright section extracting means.

Furthermore, the process at S240 according to the present embodiment corresponds to a probability correcting means. The process at S250 according to the present embodiment corresponds to a vehicle light source estimating means.

REFERENCE SIGNS LIST

1 light control system
10 processing unit
11 memory
20 camera
21 speed sensor
22 steering angle sensor
30 light control unit

The invention claimed is:

1. An apparatus that is mounted in an own vehicle and detects a light source of an additional vehicle, the apparatus comprising:
    a processor,
    wherein the processor is configured to:
        acquire a captured image of a field of view in a cruising direction of the own vehicle;
        extract a light source candidate in the captured image;
        calculate a probability of the light source candidate being a vehicle light source originated from an additional vehicle based on light source parameters;
        correct the probability of the light source candidate being the vehicle light source from the originally calculated probability to a higher corrected probability in response to a dark section in the captured image being located within a predetermined distance below the light source candidate, the dark section being darker than a periphery of the additional vehicle in the captured image;
        estimate the light source candidate to be the light source of the additional vehicle based on the higher corrected probability; and
        remove the light source candidate from being a candidate for the vehicle light source in response to the dark section being located outside the predetermined distance below the light source candidate.

2. The apparatus according to claim 1, wherein the processor is configured to further:
    extract, in the captured image, a similar-color light area that is present below the light source candidate and has a color that is similar to the color of the light source candidate; and
    correct the probability of the light source candidate being the vehicle light source, below which the similar-color light area is present, from the originally calculated probability to the higher corrected probability in response to the dark section being located within the predetermined distance below the light source candidate.

3. The apparatus according to claim 2, wherein the processor is configured to:
    correct the probability of the light source candidate being the vehicle light source based on a distance from the light source candidate to the similar-color light area.

4. The apparatus according to claim 1, wherein:
    the processor is configured to:
    extract, in the captured image, a plurality of light source candidates;
    extract, in the captured image, a tail light source candidate that indicates a light source having a color that is similar to the color of a taillight, from the light source candidates;
    extract, in the captured image, a bright section that indicates an area located on a left or right side of the tail light source candidate that is brighter than the periphery of the tail light source candidate; and
    correct the probability of the tail light source candidate with the bright section being located on the left or right side of the tail light source candidate being the vehicle light source from the originally calculated probability to the higher corrected probability.

5. The apparatus according to claim 2, wherein the processor is configured to:
  extract, in the captured image, a plurality of light source candidates;
  extract, in the captured image, a tail light source candidate that indicates a light source having a color that is similar to the color of a taillight, from the light source candidates;
  extract, in the captured image, a bright section that indicates an area located on a left or right side of the tail light source candidate that is brighter than the periphery of the tail light source candidate; and
  correct the probability of the tail light source candidate with the bright section being located on the left or right side of the tail light source candidate being the vehicle light source from the originally calculated probability to the higher corrected probability.

6. The apparatus according to claim 3, wherein the processor is configured to:
  extract, in the captured image, a plurality of light source candidates;
  extract, in the captured image, a tail light source candidate that indicates a light source having a color that is similar to the color of a taillight, from the light source candidates;
  extract, in the captured image, a bright section that indicates an area located on a left or right side of the tail light source candidate that is brighter than the periphery of the tail light source candidate; and
  correct the probability of the tail light source candidate with the bright section being located on the left or right side of the tail light source candidate being the vehicle light source from the originally calculated probability to the higher corrected probability.

7. A vehicle light source detection apparatus that is an apparatus that is mounted in an own vehicle and detects a light source of an additional vehicle, the vehicle light source detection apparatus comprising:
  a processor,
  wherein the processor is configured to:
    acquire a captured image of a field of view in a cruising direction of the own vehicle;
    extract a light source candidate in the captured image;
    calculate a probability of the light source candidate being a vehicle light source originated from an additional vehicle based on light source parameters;
    extract, in the captured image, a similar-color light area that is present below the light source candidate and has a color that is similar to the color of the light source candidate;
    correct the probability of the light source candidate being the vehicle light source, below which the similar-color light area is present, from the originally calculated probability to a higher corrected probability; and
    remove the light source candidate from being a candidate for the vehicle light source in response to a dark section in the captured image being located outside a predetermined distance below the light source candidate, the dark section being darker than a periphery of the additional vehicle in the captured image.

8. A method of detecting a light source of an additional vehicle, the method comprising:
  acquiring a captured image of a field of view in a cruising direction of an own vehicle;
  extracting a light source candidate in the captured image;
  calculating a probability of the light source candidate being a vehicle light source originated from an additional vehicle based on light source parameters;
  correcting the probability of the light source candidate from the originally calculated probability to a higher corrected probability in response to a dark section in the captured image is located within a predetermined distance below the light source candidate, the dark section being darker than a periphery of the additional vehicle in the captured image;
  estimating the light source candidate to be the light source of the additional vehicle based on the higher corrected probability; and
  removing the light source candidate from being a candidate for the vehicle light source when the dark section is located outside the predetermined distance below the light source candidate.

9. A non-transitory computer readable program medium, the program providing a computer with instructions including:
  acquiring a captured image of a field of view in a cruising direction of an own vehicle;
  extracting a light source candidate in the captured image;
  calculating a probability of the light source candidate being a vehicle light source originated from an additional vehicle based on light source parameters;
  correcting the probability of the light source candidate being the vehicle light source from the originally calculated probability to a higher corrected probability when a dark section in the captured image is located within a predetermined distance below the light source candidate, the dark section being darker than a periphery of the additional vehicle in the captured image;
  estimating the light source candidate to be the light source of the additional vehicle based on the higher corrected probability; and
  removing the light source candidate from being a candidate for the vehicle light source when the dark section is located outside the predetermined distance below the light source candidate.

* * * * *